United States Patent
Wang

(10) Patent No.: US 12,029,202 B1
(45) Date of Patent: Jul. 9, 2024

(54) EGG INCUBATOR

(71) Applicant: Daoli Wang, Wuxi (CN)

(72) Inventor: Daoli Wang, Wuxi (CN)

(*) Notice: Subject to any disclaimer, the term of this patent is extended or adjusted under 35 U.S.C. 154(b) by 0 days.

(21) Appl. No.: 18/487,369

(22) Filed: Oct. 16, 2023

Related U.S. Application Data

(63) Continuation-in-part of application No. 18/082,602, filed on Dec. 16, 2022, now Pat. No. 11,819,009.

(51) Int. Cl.
*A01K 41/02* (2006.01)
*A01K 41/04* (2006.01)
*A01K 41/06* (2006.01)

(52) U.S. Cl.
CPC .............. *A01K 41/02* (2013.01); *A01K 41/04* (2013.01); *A01K 41/06* (2013.01)

(58) Field of Classification Search
CPC ...... A01K 41/02; A01K 41/026; A01K 41/04; A01K 41/06
See application file for complete search history.

(56) References Cited

U.S. PATENT DOCUMENTS

| | | | | |
|---|---|---|---|---|
| 1,264,664 A * | 4/1918 | Light | A01K 41/06 | 119/327 |
| 1,270,931 A * | 7/1918 | Dudley et al. | A01K 41/06 | 119/327 |
| 1,444,783 A * | 2/1923 | Elliott | A01K 41/06 | 119/323 |
| 1,473,792 A * | 11/1923 | Matheus | A01K 41/06 | 119/323 |
| 1,560,746 A * | 11/1925 | Walter | A01K 41/06 | 119/323 |
| 1,579,350 A * | 4/1926 | Davis | A01K 41/06 | 119/325 |
| 1,608,408 A * | 11/1926 | Mackenzie | A01K 41/06 | 119/323 |
| 1,608,776 A * | 11/1926 | Davis | A01K 41/06 | 99/644 |
| 1,616,972 A * | 2/1927 | Hilton | A01K 41/06 | 119/327 |
| 1,617,920 A * | 2/1927 | Miller | A01K 41/06 | 119/323 |

(Continued)

FOREIGN PATENT DOCUMENTS

| | | | | |
|---|---|---|---|---|
| GB | 2093328 A * | 9/1982 | | A01K 41/06 |
| WO | WO-8803362 A1 * | 5/1988 | | |
| WO | WO-2019213659 A1 * | 11/2019 | | A01K 41/04 |

*Primary Examiner* — Monica L Perry
*Assistant Examiner* — Aaron M Rodziwicz
(74) *Attorney, Agent, or Firm* — Daniel M. Cohn; Howard M. Cohn

(57) ABSTRACT

An egg incubator includes an incubator base, an incubator upper cover, a heating assembly, an egg turning assembly, and a water supply assembly. A first water tank and a second water tank are disposed inside the incubator base. The first water tank and the second water tank are communicated with each other. A third water tank communicated with the second water tank is disposed on one side of the incubator base. A mesh plate is lapped inside the incubator base. An inner wall bottom of the first water tank is higher than an inner wall bottom of the second water tank. A water supply assembly is mounted on the third water tank and the water supply assembly (5) is configured to supply water to the first water tank, the second water tank, and the third water tank.

10 Claims, 11 Drawing Sheets

(56) References Cited

U.S. PATENT DOCUMENTS

| | | | | | |
|---|---|---|---|---|---|
| 1,738,685 | A | * | 12/1929 | Bohmker | A01K 41/06 119/323 |
| 2,404,228 | A | * | 7/1946 | Hamlin | A01K 41/06 74/110 |
| 2,486,030 | A | * | 10/1949 | Delwin, V | A01K 41/06 414/781 |
| 2,625,906 | A | * | 1/1953 | Forney | A01K 41/06 68/152 |
| 3,669,075 | A | * | 6/1972 | Marsh | A01K 41/06 119/323 |
| 3,783,833 | A | * | 1/1974 | Bailey | A01K 41/06 119/319 |
| 2002/0150460 | A1 | * | 10/2002 | Chalker, II | A01K 45/007 414/781 |
| 2019/0335717 | A1 | * | 11/2019 | Zhao | A01K 41/06 |

* cited by examiner

EGG INCUBATOR

TECHNICAL FIELD

The present disclosure relates to the technical field of egg incubation, and in particular to an egg incubator.

BACKGROUND ART

It is necessary to maintain a certain humidity during the incubation of eggs. The humidity is as important as a temperature, and it is also one of key factors that determine an incubation performance. Generally, the incubation humidity is maintained at about 50% within 1-18 days in an incubation period and is maintained at about 70% within 19-21 days in a hatching period.

In the prior art, an egg incubator is an apparatus for incubating eggs. It is necessary to maintain the humidity in the incubator, which requires to dispose a water storage tank inside the incubator to store water and evaporate the water by means of a temperature and air flow inside the incubator to form water vapor. However, due to limitations from a traditional egg incubator structure, a water injection structure thereof is relatively complex, and it is necessary to add water frequently.

Therefore, how to provide an egg incubator to simplify the water injection structure of the egg incubator and reduce the water addition frequency of the egg incubator has become a technical problem to be urgently solved.

SUMMARY OF THE INVENTION

How to provide an egg incubator to simplify a water injection structure of an egg incubator and reduce the water addition frequency of the egg incubator becomes a technical problem to be solved by the present disclosure.

For this purpose, according to a first aspect, an embodiment of the present disclosure discloses an egg incubator, including an incubator base, an incubator upper cover, a heating assembly, an egg turning assembly and a water supply assembly, a first water tank and a second water tank which communicate with each other being disposed inside the incubator base, a third water tank communicating with the second water tank being disposed on one side of the incubator base, a mesh plate being lapped inside the incubator base, an inner wall bottom of the first water tank being higher than an inner wall bottom of the second water tank, a water supply assembly being mounted on the third water tank, and the water supply assembly being used for supplying water to the first water tank, the second water tank and the third water tank;

the egg turning assembly including egg troughs, a connecting plate and an egg turning motor, the egg troughs being used for holding a plurality of eggs and being lapped with the incubator base and the connecting plate, respectively, the connecting plate being movably connected to the inside of the incubator base, and the egg turning motor being mounted on the bottom of the incubator base and being used for driving the connecting plate to slide left and right in the incubator base so as to drive the egg troughs to swing left and right in the incubator base; and the heating assembly being used for supplying incubation heat to the eggs in the egg troughs, and the incubator upper cover being made of a transparent material and being provided with a control panel for controlling working states of the heating assembly and the egg turning assembly.

The present disclosure is further set as that the egg incubator further includes a temperature probe and a humidity probe, the temperature probe is used for detecting an incubation temperature inside the egg incubator, and the humidity probe is used for detecting an incubation humidity inside the egg incubator.

The present disclosure is further set as that the heating assembly includes a plurality of wrapping posts fixedly connected to the incubator upper cover, and the wrapping posts are wound with heating wires used for supplying heat to the egg incubator.

The present disclosure is further set as that a fan is disposed inside the incubator upper cover.

The present disclosure is further set as that the incubator upper cover is provided with an air outlet and is rotatably connected with a baffle for closing or opening the air outlet.

The present disclosure is further set as that an output shaft of the egg turning motor is provided with a driving gear, a driven gear meshed with the driving gear is connected to the bottom of the connecting plate, and the incubator base is provided with a through hole for facilitating the movement of the driven gear.

The present disclosure is further set as that a detachably connected cover plate is disposed inside the incubator base, and the cover plate is used for limiting a movement stroke of the driven gear.

The present disclosure is further set as that the egg turning motor is fixedly mounted on the bottom of the incubator base by a motor fixing plate, the incubator base is provided with a motor cover for covering the egg turning motor, and the motor cover is detachably connected to the incubator base.

The present disclosure is further set as that the water supply assembly includes a water supply valve and a water supply bottle, the water supply bottle is in threaded connection to the water supply valve, the water supply valve is embedded in the third water tank and provided with an air inlet and a water outlet respectively located in the third water tank, the water outlet communicates with the water supply bottle, and the air inlet is used for supplying air to the water supply bottle.

The present disclosure is further set as that the horizontal height of the air inlet is greater than the horizontal height of the water outlet.

The present disclosure has the following beneficial effects: the inner wall bottom of the first water tank is higher than the inner wall bottom of the second water tank, the water supply assembly is mounted on the third water tank, and the water supply assembly supplies water to the first water tank, the second water tank and the third water tank, and thus, provided is the egg incubator by which a water injection structure of the egg incubator is simplified, and the water addition frequency and manufacturing cost of the egg incubator are reduced.

BRIEF DESCRIPTION OF THE DRAWINGS

To describe the technical solutions in specific implementations of the present disclosure or the prior art more clearly, the accompanying drawings required for describing the specific implementations or the prior art will be briefly introduced below. Apparently, the accompanying drawings in the following description show only some implementations of the present disclosure, and those of ordinary skill in the art may still derive other accompanying drawings from these accompanying drawings without creative efforts.

Numerals in the accompanying drawings: 1, incubator base; 11, first water tank; 12, second water tank; 13, third water tank; 14, through hole; 15, first lapping slot; 2, incubator upper cover; 21, air outlet; 22, baffle; 3, heating assembly; 31, wrapping post; 32, heating wire; 4, egg turning assembly; 41, egg trough; 411, first lapping shaft; 412, second lapping shaft; 42, connecting plate; 421, insert block; 422, second lapping slot; 43, egg turning motor; 44, driving gear; 45, driven gear; 451, slot; 46, motor fixing plate; 47, motor cover; 48, cover plate; 5, water supply assembly; 51, water supply valve; 511, air inlet; 512, water outlet; 513, first opening; 514, second opening; 515, support post; 52, water supply bottle; 6, mesh plate; 7, control panel; 8, temperature probe; 9, humidity probe; and 10, fan.

DETAILED DESCRIPTION OF THE INVENTION

In order to make objectives, technical solutions and advantages of the present disclosure clearer and more understandable, the present disclosure will be further described in detail below in conjunction with the accompanying drawings and embodiments. It should be understood that the specific embodiments described herein are only intended to explain the present disclosure, rather than to limit the present disclosure.

In the description of the present disclosure, it should be noted that unless explicitly specified and limited otherwise, the terms "mounted", "connected" and "connection" should be understood in a broad sense, for example, connection may be fixed connection or detachable connection, or integral connection, may be mechanical connection or electrical connection, may be direct connection or indirect connection via an intermediate medium, may be internal communication of two elements, and may be wireless connection or wired connection. For those of ordinary skill in the art, the specific meanings of the above terms in the present disclosure may be understood according to specific situations.

In the description of the present disclosure, it should be noted that directional or positional relationships indicated by terms such as "center", "upper", "lower", "left", "right", "vertical", "horizontal", "inner" and "outer" are directional or positional relationships based on the accompanying drawings, are merely intended to facilitate describing the present disclosure and simplifying the description, rather than to indicate or imply that the appointed apparatus or element has to be located in a specific direction or structured and operated in the specific direction so as not to be understood as restrictions on the present disclosure. In addition, terms "first", "second" and "third" are for descriptive purposes only, and cannot be understood as indicating or implying the relative importance.

In addition, technical features related to the different implementations of the present disclosure described as below may be combined with each other as long as no conflicts occur.

Figure 1:
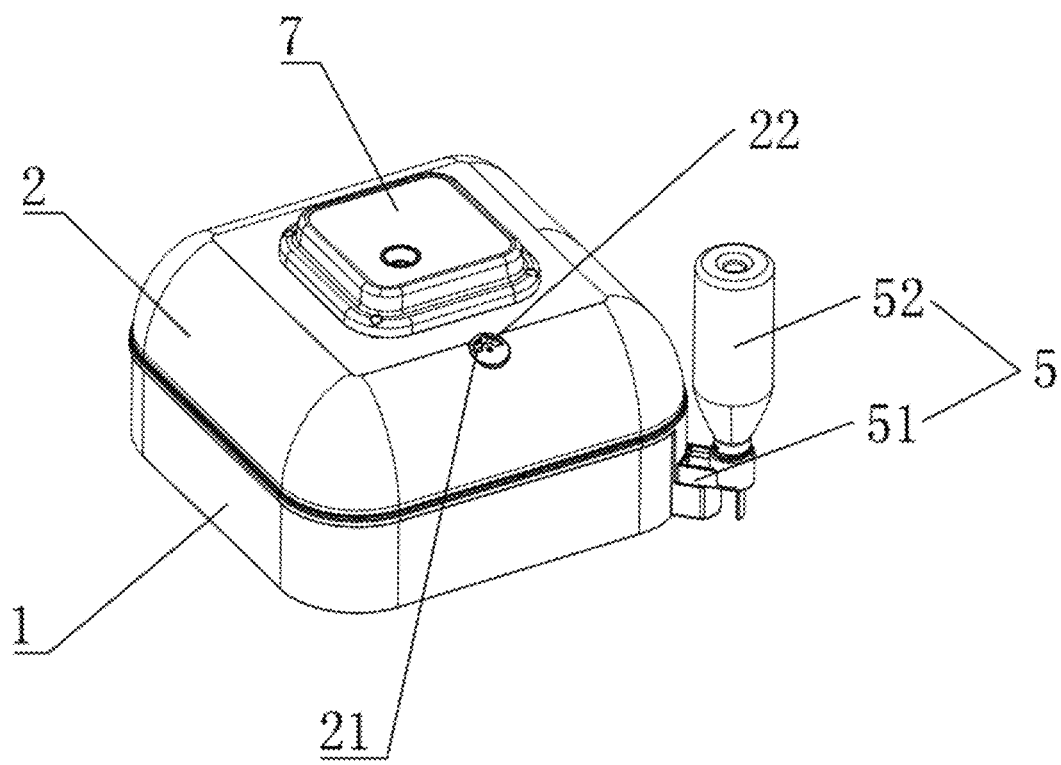
FIG. 1 is a schematic view of a three-dimensional structure of an egg incubator disclosed in the present embodiment.
Figure 2:
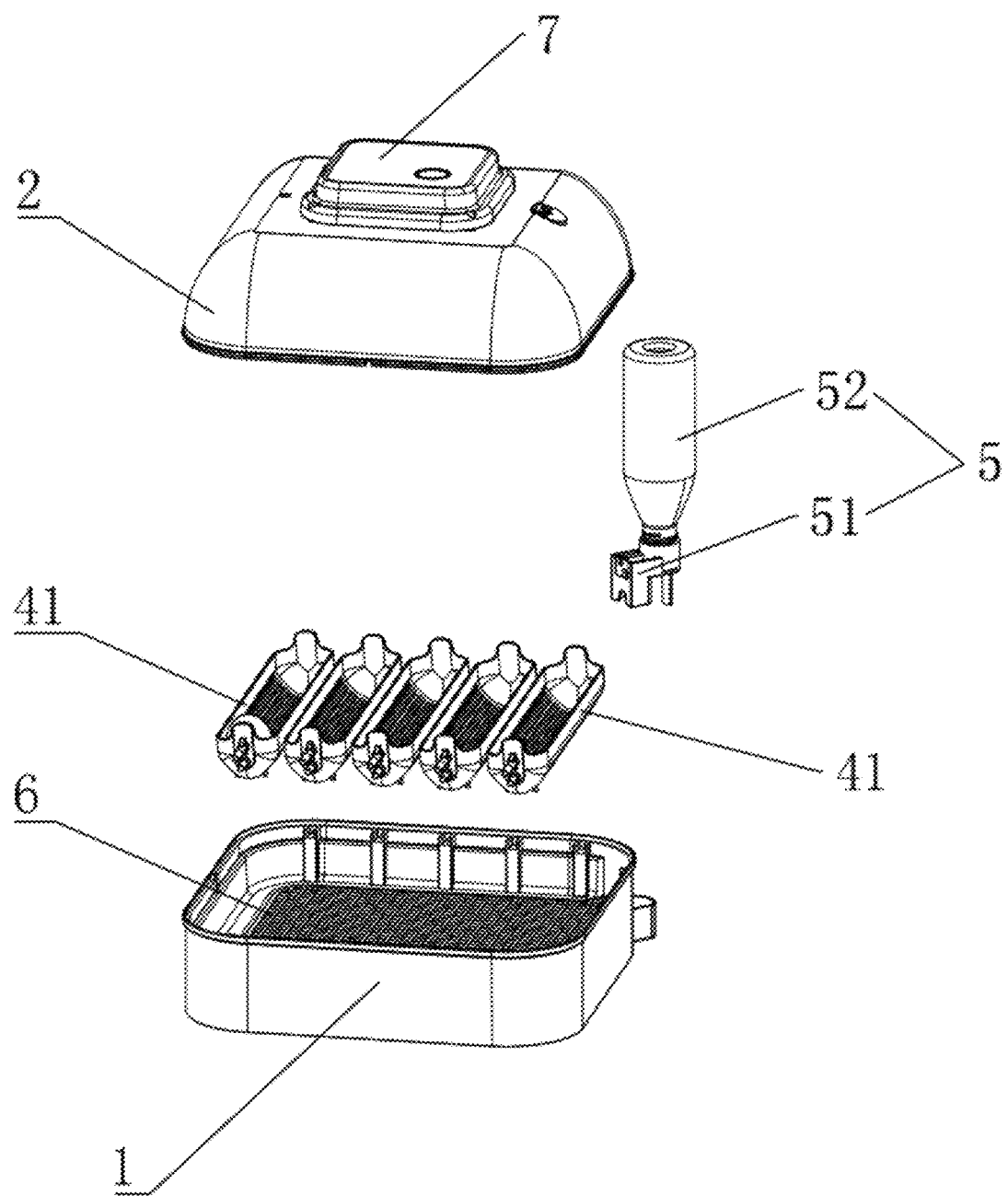
FIG. 2 is a first schematic view of an exploded structure of the egg incubator disclosed in the present embodiment.
Figure 3:
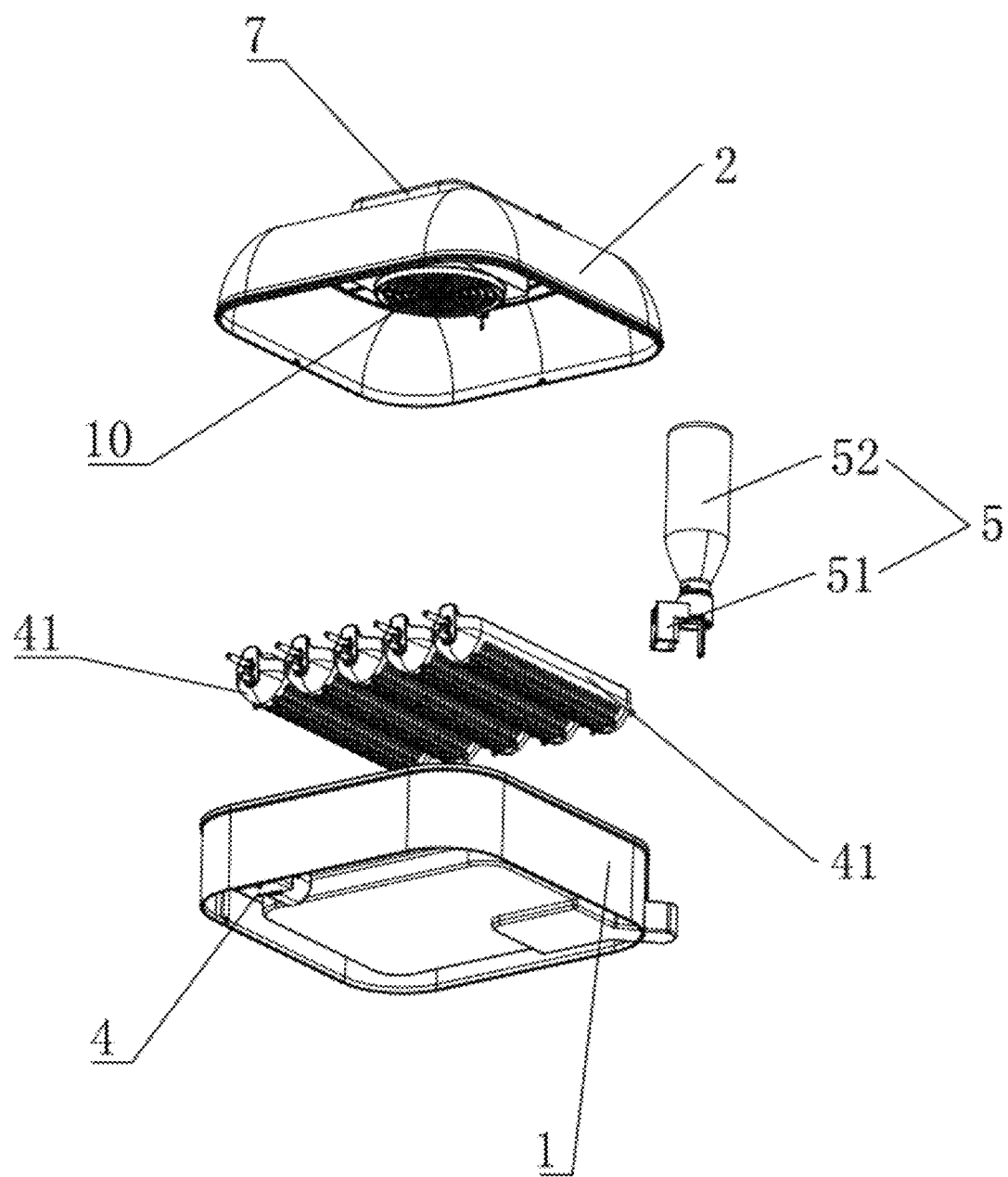
FIG. 3 is a second schematic view of the exploded structure of the egg incubator disclosed in the present embodiment.
Figure 4:
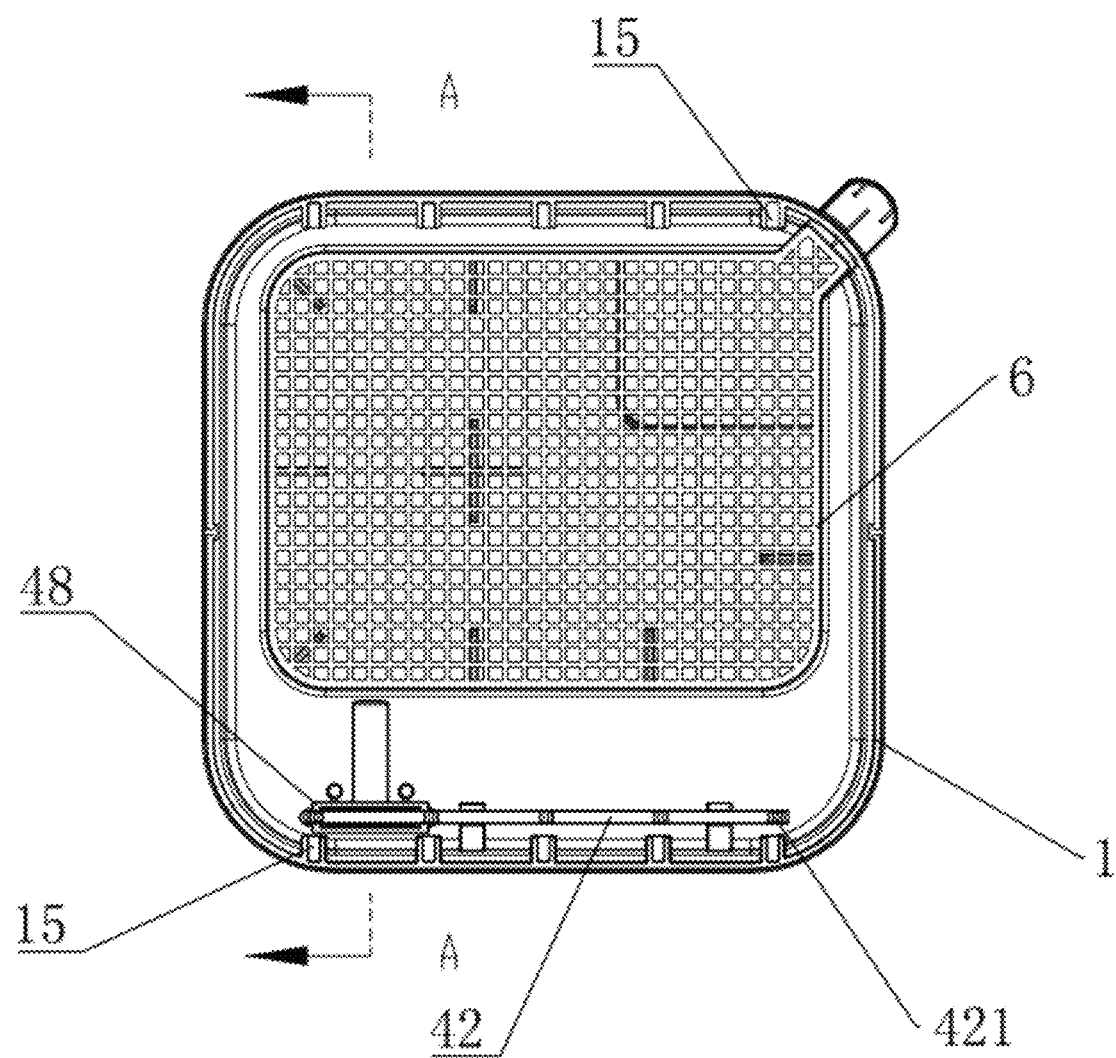
FIG. 4 is a schematic view of a local structure of the egg incubator disclosed in the present embodiment.
Figure 5:
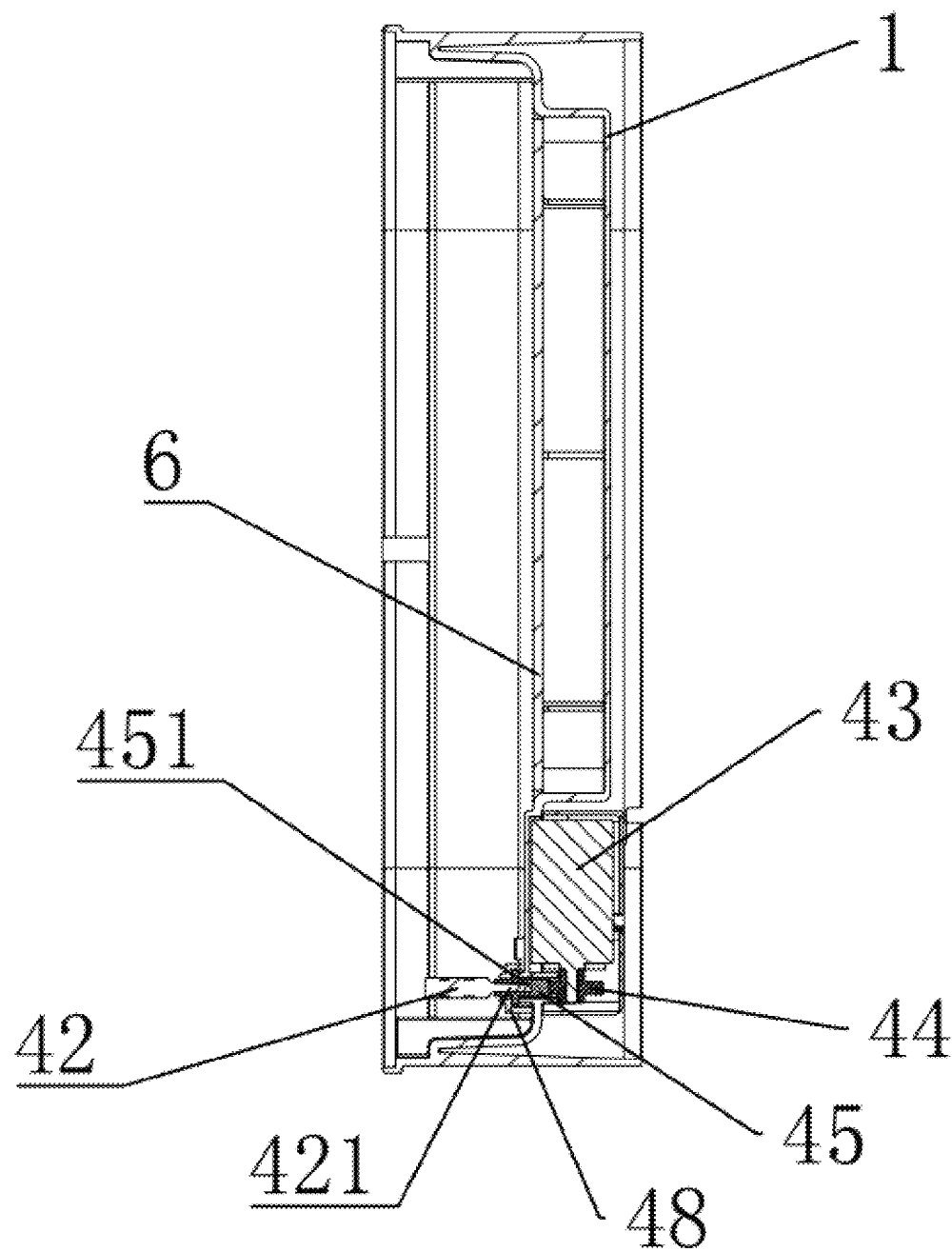
FIG. 5 is a schematic view of an A-A sectional structure in FIG. 4.
Figure 6:
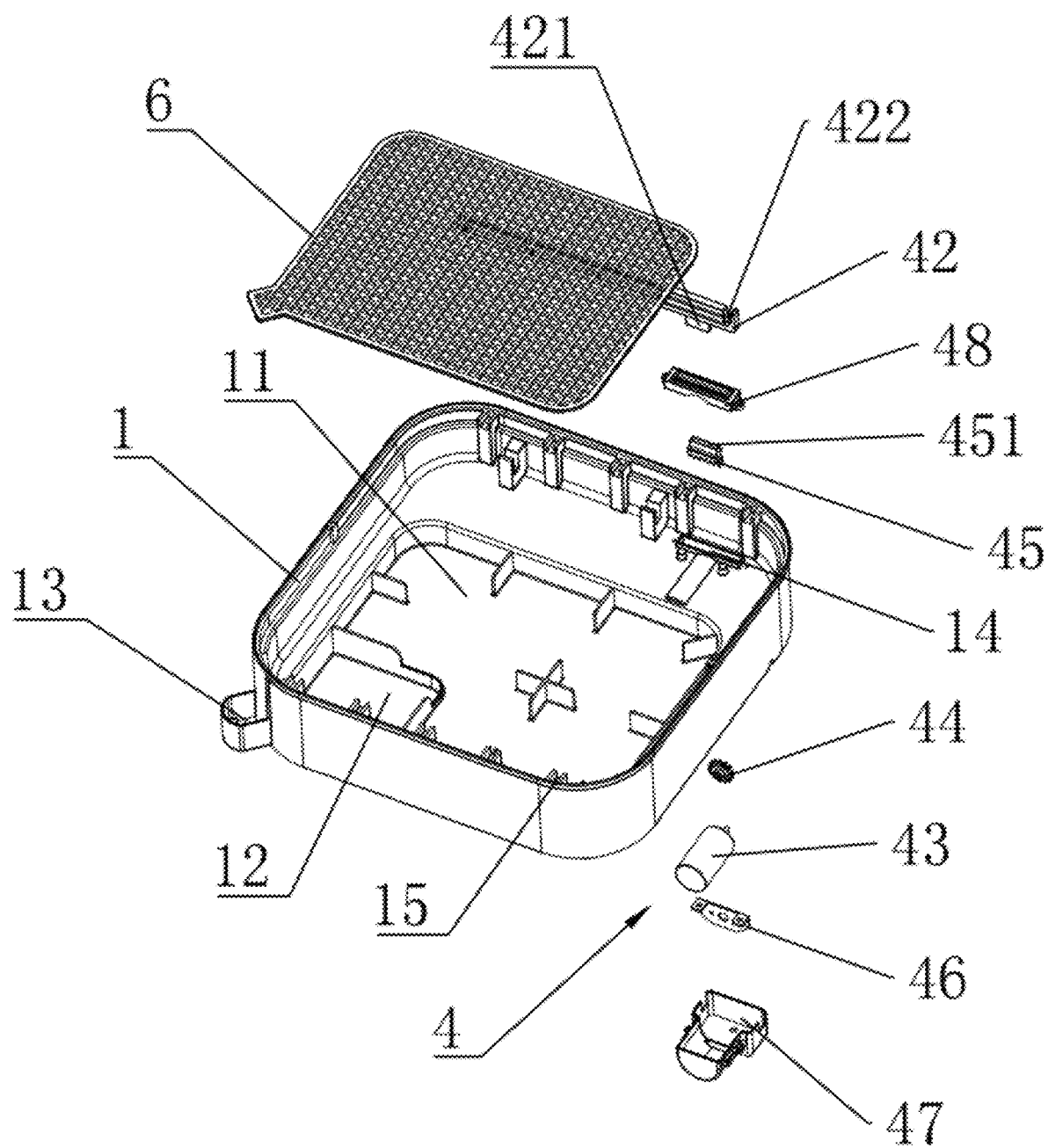
FIG. 6 is a schematic view of an exploded structure of an egg turning assembly of the egg incubator disclosed in the present embodiment.
Figure 7:
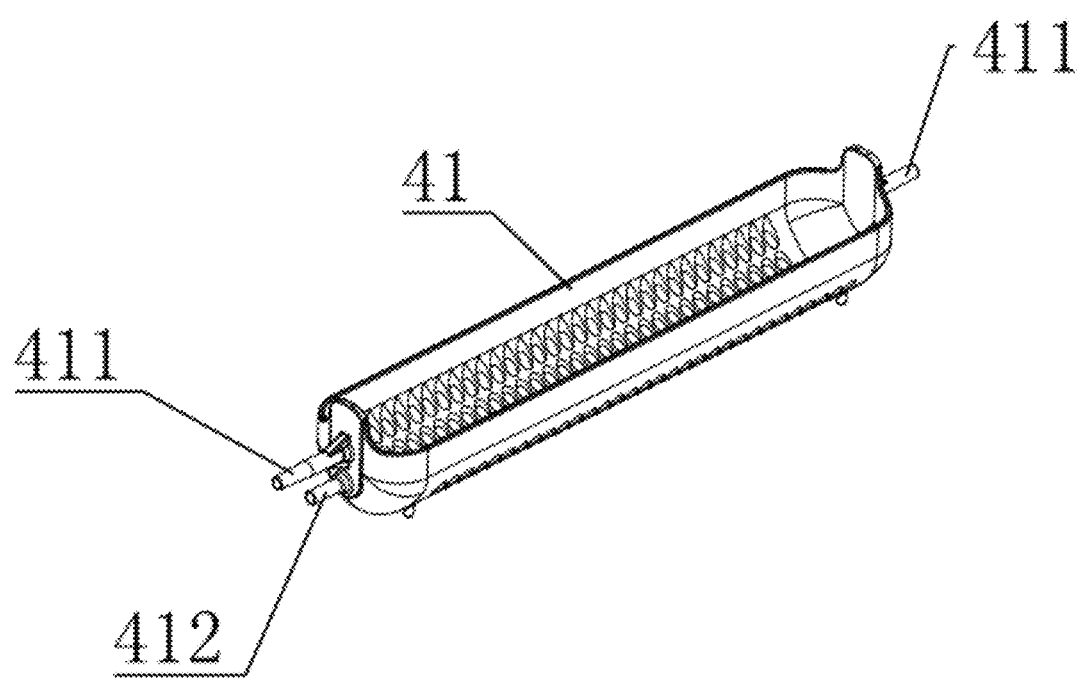
FIG. 7 is a schematic structural view of an egg trough of the egg incubator disclosed in the present embodiment.
Figure 8:
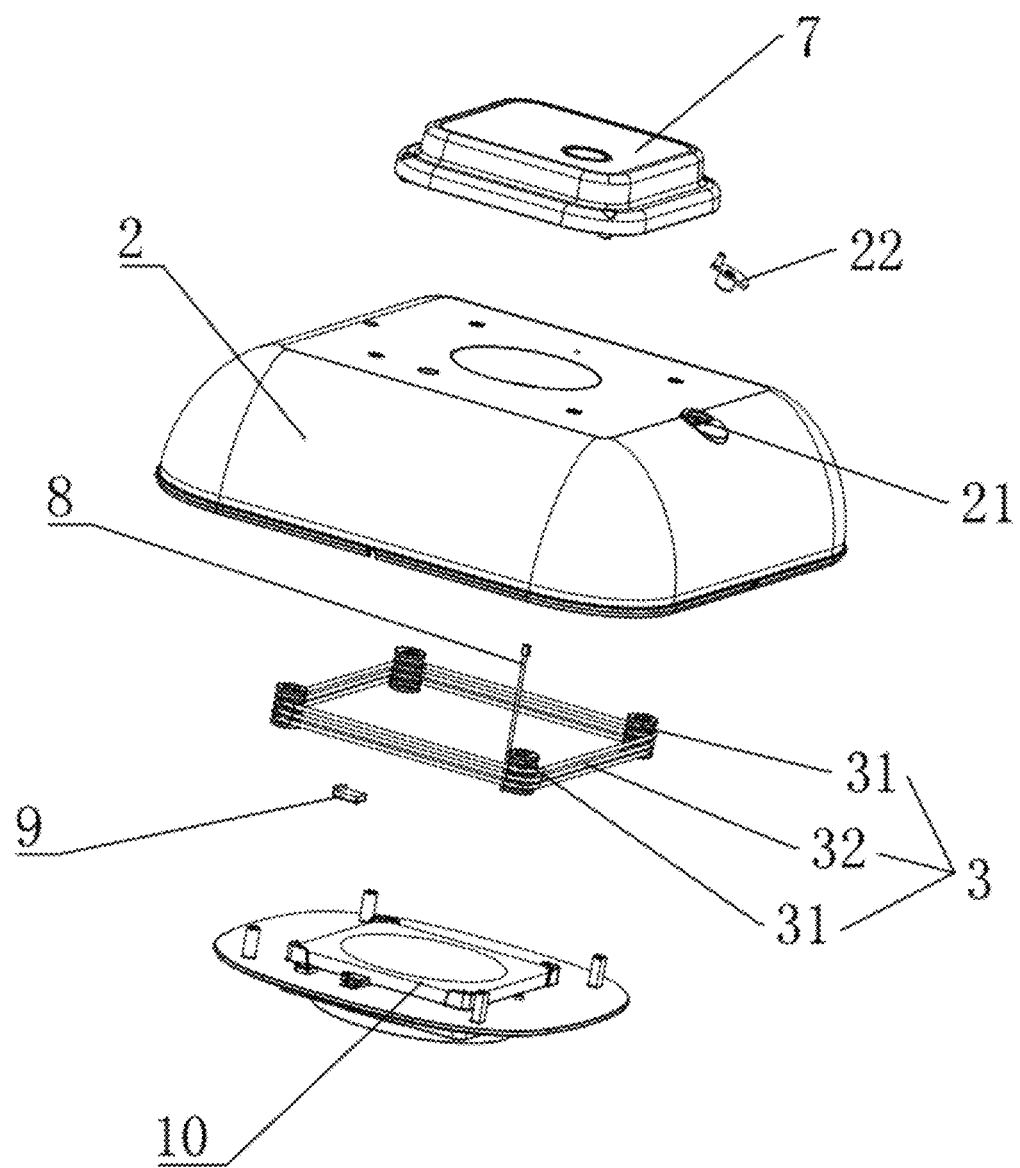
FIG. 8 is a schematic view of an exploded structure of a heating assembly of the egg incubator disclosed in the present embodiment.
Figure 9:
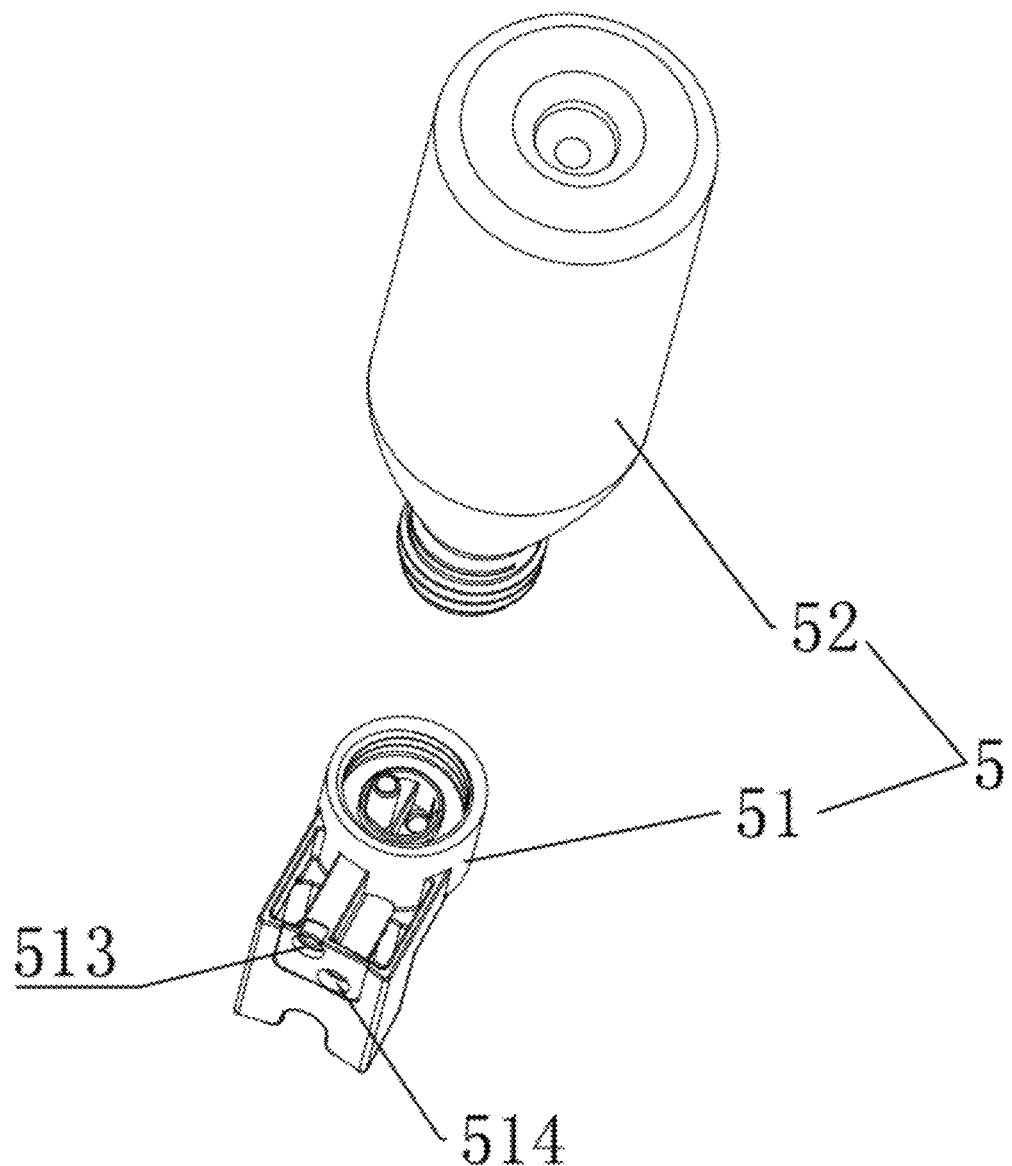
FIG. 9 is a schematic view of an exploded structure of a water supply assembly of the egg incubator disclosed in the present embodiment.
Figure 10:
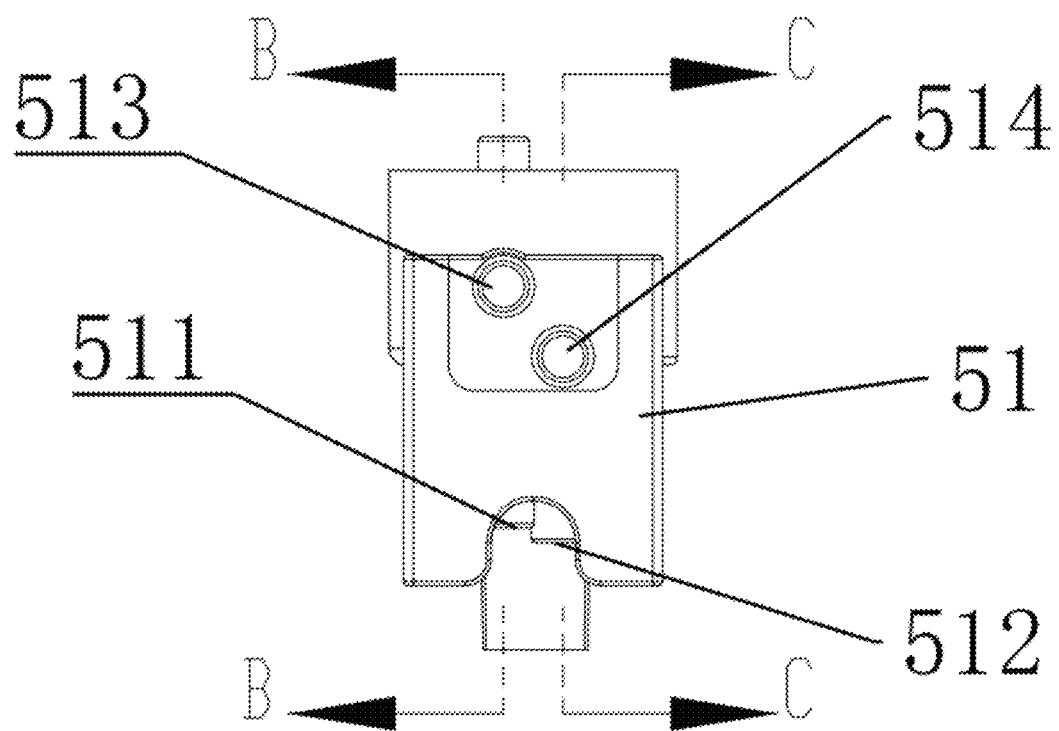
FIG. 10 is a lateral view of a water supply bottle of the egg incubator disclosed in the present embodiment.
Figure 11:
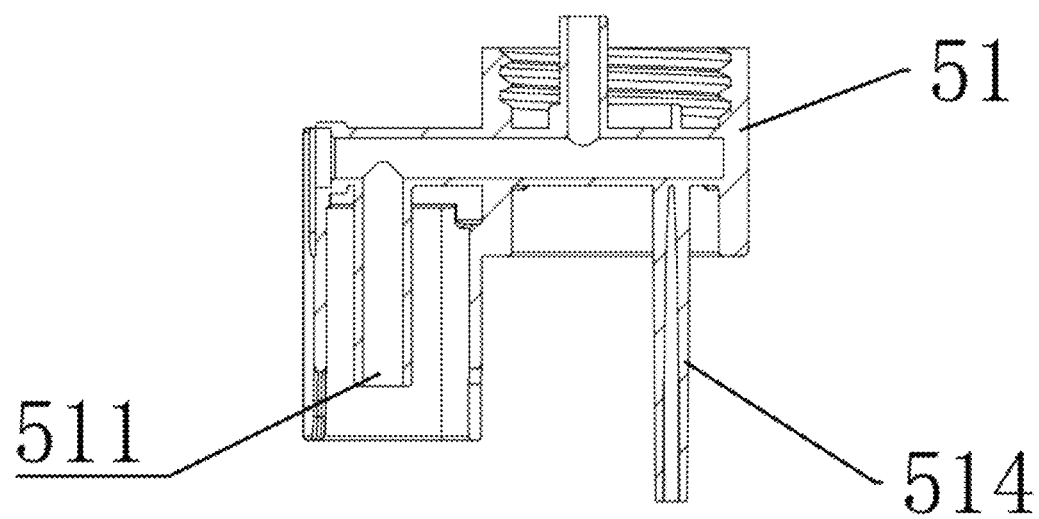
FIG. 11 is a schematic view of a B-B sectional structure in FIG. 10.
Figure 12:
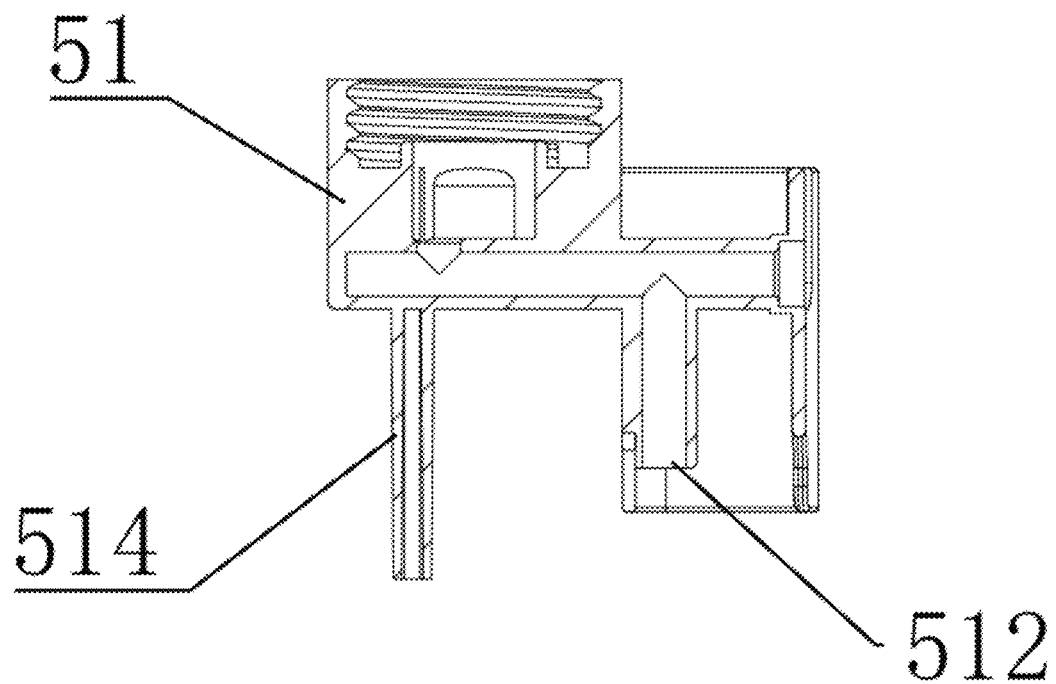
FIG. 12 is a schematic view of a C-C sectional structure in FIG. 10.

An embodiment of the present disclosure discloses an egg incubator, as shown in FIG. 1 to FIG. 12, including an incubator base 1, an incubator upper cover 2, a heating assembly 3, an egg turning assembly 4 and a water supply assembly 5, a first water tank 11 and a second water tank 12 which communicate with each other being disposed inside the incubator base 1, a third water tank 13 communicating with the second water tank 12 being disposed on one side of the incubator base 1, a mesh plate 6 being lapped inside the incubator base 1, an inner wall bottom of the first water tank 11 being higher than an inner wall bottom of the second water tank 12, a water supply assembly being mounted on the third water tank 13, and the water supply assembly 5 being used for supplying water to the first water tank 11, the second water tank 12 and the third water tank 13;

the egg turning assembly 4 including egg troughs 41, a connecting plate 42 and an egg turning motor 43, the egg troughs 41 being used for holding a plurality of eggs and being lapped with the incubator base 1 and the connecting plate 42, respectively, the connecting plate 42 being movably connected to the inside of the incubator base 1, and the egg turning motor 43 being mounted on the bottom of the incubator base 1 and being used for driving the connecting plate 42 to slide left and right in the incubator base 1 so as to drive the egg troughs 41 to swing left and right in the incubator base 1; and the heating assembly 3 being used for supplying incubation heat to the eggs in the egg troughs 41, and the incubator upper cover 2 being made of a transparent material and being provided with a control panel 7 for controlling working states of the heating assembly 3 and the egg turning assembly 4.

It should be noted that the inner wall bottom of the first water tank 11 is higher than the inner wall bottom of the second water tank 12, the water supply assembly is mounted on the third water tank 13, and the water supply assembly 5 supplies water to the first water tank 11, the second water tank 12 and the third water tank 13, and thus, provided is the egg incubator by which a water injection structure of the egg incubator is simplified, and the water addition frequency and manufacturing cost of the egg incubator are reduced.

As shown in FIG. 3 to FIG. 8, the egg incubator further includes a temperature probe 8 and a humidity probe 9, the temperature probe 8 is used for detecting an incubation temperature inside the egg incubator, and the humidity probe 9 is used for detecting an incubation humidity inside the egg incubator. It should be noted that both the temperature probe 8 and the humidity probe 9 play a detection role, facilitate displaying the temperature and humidity inside the egg incubator, and may also display numerical values on the control panel 7.

As shown in FIG. 3 to FIG. 8, the heating assembly 3 includes a plurality of wrapping posts 31 fixedly connected to the incubator upper cover 2, and the wrapping posts 31 are wound with heating wires 32 used for supplying heat to the egg incubator. It should be noted that, due to the heating effect of the heating wires 32, the heating wires 32 facilitating supplying heat to the egg incubator make the eggs in the egg troughs 41 incubated.

As shown in FIG. 3 to FIG. 8, a fan 10 is disposed inside the incubator upper cover 2. It should be noted that the fan 10 is mounted on the bottoms of the heating wires 32, and due to the ventilation effect of the fan 10, it is convenient to adjust the temperature inside the egg incubator.

As shown in FIG. 1 to FIG. 8, the incubator upper cover 2 is provided with an air outlet 21 and is rotatably connected with a baffle 22 for closing or opening the air outlet 21. It should be noted that, due to the arrangement of the air outlet 21, it is convenient to mutually circulate air in the egg incubator; and the baffle 22 plays a blocking role to stop the circulation of air.

As shown in FIG. 4 to FIG. 7, an output shaft of the egg turning motor 43 is provided with a driving gear 44, a driven gear 45 meshed with the driving gear 44 is connected to the bottom of the connecting plate 42, and the incubator base 1 is provided with a through hole 14 for facilitating the movement of the driven gear 45. An insert block 421 is disposed on one end of the connecting plate 42, and the driven gear 45 is provided with a slot 451 in splicing fit with the insert block 421. During specific implementation, the insert block 421 and the connecting plate 42 are of an integrally formed structure. Due to the splicing fit between the insert block 421 and the slot 451, the connecting plate 42 is connected to the driven gear 45, which facilitates transferring the movement of the driving gear 44 to the connecting plate 42, thereby driving the egg troughs 41 to swing, and automatically turning the eggs.

As shown in FIG. 4 to FIG. 7, the driving gear 44 is a circular gear, and the driven gear 45 is a straight gear. It should be noted that since the driving gear 44 is the circular gear, and the driven gear 45 is the straight gear, the driving gear 44 cooperates with the driven gear 45, which facilitates converting the rotational movement of the egg turning motor 43 into the linear movement of the connecting plate 42.

It should be noted that due to the forward and reverse rotation effects of the egg turning motor 43, the driving gear 44 is driven to rotate; since the driving gear 44 is meshed with the driven gear 45, the driven gear 45 starts to synchronously move; due to the splicing fit between the driven gear 45 and the connecting plate 42, the connecting plate 42 move left and right in the incubator base 1; and since the egg troughs 41 are lapped with the incubator base 1 and the connecting plate 42, respectively, the connecting plate 42 drives the egg troughs 41 to swing, which facilitates turning the eggs in the egg troughs 41.

As shown in FIG. 4 to FIG. 7, a detachably connected cover plate 48 is disposed inside the incubator base 1, and the cover plate 48 is used for limiting a movement stroke of the driven gear 45.

As shown in FIG. 4 to FIG. 7, the egg turning motor 43 is fixedly mounted on the bottom of the incubator base 1 by a motor fixing plate 46, the incubator base 1 is provided with a motor cover 47 for covering the egg turning motor 43, and the motor cover 47 is detachably connected to the incubator base 1. It should be noted that the motor cover 47 plays a covering role and facilitates covering the egg turning motor 43, so that the egg turning motor 43 is hidden and mounted on the bottom of the incubator base 1, the appearance of the incubator is beautified, heat generated by the egg turning motor 43 can be directly discharged to the external space without affecting the incubation of the eggs in the egg troughs 41, and the incubation efficiency of the incubator is increased; in addition, the egg turning assembly 4 and the incubator base 1 share mounting parts, so that a structure of an egg turner is simplified, and the manufacturing cost of the incubator is reduced; moreover, the internal space of the incubator occupied by the egg turner is smaller, then, the volume of the overall incubator is indirectly reduced, and the production and transportation costs of the incubator are reduced.

As shown in FIG. 1 to FIG. 12, a mounting groove for facilitating mounting the egg turning motor 43 is disposed in the bottom of the incubator base 1. It should be noted that, by disposing the mounting groove, it is convenient to mount the egg turning motor 43 on the bottom of the incubator base 1.

As shown in FIG. 1 to FIG. 7, each of two ends of each of the egg troughs 41 is provided with a first lapping shaft 411, and a first lapping slot 15 lapped and matched with the first lapping shaft 411 is disposed inside the incubator base 1. During specific implementation, the first lapping shaft 411 and the egg trough 41 are of an integrally formed structure.

As shown in FIG. 1 to FIG. 7, the connecting plate 42 is provided with at least one second lapping slot 422, and each of the egg troughs 41 is provided with a second lapping shaft 412 lapped and matched with the second lapping slot 422. During specific implementation, the second lapping shaft 412 and the egg trough 41 are of an integrally formed structure, and the second lapping shaft 412 is located below the first lapping shaft 411.

As shown in FIG. 9 to FIG. 12, the water supply assembly 5 includes a water supply valve 51 and a water supply bottle 52, the water supply bottle 52 is in threaded connection to the water supply valve 51, the water supply valve 51 is embedded in the third water tank 13 and is provided with an air inlet 511 and a water outlet 512 respectively located in the third water tank 13, the water outlet 512 communicates with the water supply bottle 52, and the air inlet 511 is used for supplying air to the water supply bottle 52. During specific implementation, a first opening 513 communicating with the air inlet 511 is disposed in one side of the water supply valve 51, a second opening 514 communicating with the water outlet 512 is disposed in one side of the water supply valve 51, and the first opening 513 and the second opening 514 are both plugged by a mounting plug. A support post 515 for supporting the water supply valve 51 is disposed on the bottom of the water supply valve 51. By disposing the support post 515, it is convenient to effectively support the water supply bottle 52.

As shown in FIG. 9 to FIG. 12, the horizontal height of the air inlet 511 is greater than the horizontal height of the water outlet 512. It should be noted that the horizontal height of the air inlet 511 is greater than the horizontal height of the water outlet 512, which provides convenience for air to enter the water supply bottle 52, so that water in the water supply bottle 52 smoothly flows out of the water outlet 512.

During specific implementation, the water supply valve 51 and the water supply bottle 52 filled with water are mounted on the third water tank 13, the water in the water supply bottle 52 flows out of the water outlet 512, flows from the third water tank 13 to the second water tank 12, and will be fully filled in the second water tank 12, so that the water in the second water tank 12 is about 10 mm deep. When the water in the third water tank 13 is higher than the water outlet 512 of the water supply valve 51, the water outlet 512 is closed, at the moment, the water in the second water tank 12 is used for maintaining the humidity required within 1-18 days in an incubation period; and when the water level in the third water tank 13 is reduced, and the water outlet 512 of the water supply valve 51 is exposed, the water outlet 512 is opened to start to discharge the water again until the water in the water supply bottle 52 completely flows out. When the eggs are normally incubated for 19-21 days, the humidity is required to be maintained at about 70%, which is achieved by taking out the water supply bottle 52 and the water supply valve 51, fully injecting water into the third water tank 13, fully filling water into the second water tank 12, making the water automatically overflow into the first water tank 11, and automatically keeping the water depth of the first water tank 11 at 10 mm.

Working principle: the inner wall bottom of the first water tank 11 is higher than the inner wall bottom of the second water tank 12, the water supply assembly is mounted on the third water tank 13, and the water supply assembly 5 supplies water to the first water tank 11, the second water tank 12 and the third water tank 13, and thus, provided is the egg incubator by which a water injection structure of the egg incubator is simplified, and the water addition frequency and manufacturing cost of the egg incubator are reduced.

Apparently, the above-mentioned embodiments are merely intended to clearly describe examples, rather than to limit the implementations. Those of ordinary skill in the art can also make other variations or alterations in different forms on the basis of the above-mentioned description. It is unnecessary and impossible to exhaustively list all the implementations herein. Apparent variations or alterations derived from these still fall within the protection scope of the present disclosure.

The invention claimed is:

1. An egg incubator, comprising an incubator base (1), an incubator upper cover (2), a heating assembly (3), an egg turning assembly (4) and a water supply assembly (5), a first water tank (11) and a second water tank (12) which communicate with each other being disposed inside the incubator base (1), a third water tank (13) communicating with the second water tank (12) being disposed on one side of the incubator base (1), a mesh plate (6) being lapped inside the incubator base (1), an inner wall bottom of the first water tank (11) being higher than an inner wall bottom of the second water tank (12), a water supply assembly being mounted on the third water tank (13), and the water supply assembly (5) being used for supplying water to the first water tank (11), the second water tank (12) and the third water tank (13);

the egg turning assembly (4) comprising egg troughs (41), a connecting plate (42) and an egg turning motor (43), the egg troughs (41) being used for holding a plurality of eggs and being lapped with the incubator base (1) and the connecting plate (42), respectively, the connecting plate (42) being movably connected to the inside of the incubator base (1), and the egg turning motor (43) being mounted on the bottom of the incubator base (1) and being used for driving the connecting plate (42) to slide left and right in the incubator base (1) so as to drive the egg troughs (41) to swing left and right in the incubator base (1);

the heating assembly (3) being used for supplying incubation heat to the eggs in the egg troughs (41), and the incubator upper cover (2) being made of a transparent material and being provided with a control panel (7) for controlling working states of the heating assembly (3) and the egg turning assembly (4);

an output shaft of the egg turning motor (43) is provided with a driving gear (44), a driven gear (45) meshed with the driving gear (44) is connected to the bottom of the connecting plate (42), and the incubator base (1) is provided with a through hole (14) for facilitating the movement of the driven gear (45).

2. The egg incubator of claim 1, further comprising a temperature probe (8) and a humidity probe (9), the temperature probe (8) being used for detecting an incubation temperature inside the egg incubator, and the humidity probe (9) being used for detecting an incubation humidity inside the egg incubator.

3. The egg incubator of claim 1, wherein the heating assembly (3) comprises a plurality of wrapping posts (31) fixedly connected to the incubator upper cover (2), and the wrapping posts (31) are wound with heating wires (32) used for supplying heat to the egg incubator.

4. The egg incubator of claim 3, wherein a fan (10) is disposed inside the incubator upper cover (2).

5. The egg incubator of claim 4, wherein the incubator upper cover (2) is provided with an air outlet (21) and is rotatably connected with a baffle (22) for closing or opening the air outlet (21).

6. The egg incubator of claim 1, wherein a detachably connected cover plate (48) is disposed inside the incubator base (1), and the cover plate (48) is used for limiting a movement stroke of the driven gear (45).

7. The egg incubator of claim 1, wherein the egg turning motor (43) is fixedly mounted on the bottom of the incubator base (1) by a motor fixing plate (46), the incubator base (1) is provided with a motor cover (47) for covering the egg turning motor (43), and the motor cover (47) is detachably connected to the incubator base (1).

8. The egg incubator of claim 1, wherein the water supply assembly (5) comprises a water supply valve (51) and a water supply bottle (52), the water supply bottle (52) is in threaded connection to the water supply valve (51), the water supply valve (51) is embedded in the third water tank (13) and is provided with an air inlet (511) and a water outlet (512) respectively located in the third water tank (13), the water outlet (512) communicates with the water supply bottle (52), and the air inlet (511) is used for supplying air to the water supply bottle (52).

9. The egg incubator of claim 8, wherein the horizontal height of the air inlet (511) is greater than the horizontal height of the water outlet (512).

10. An egg incubator, comprising an incubator base (1), an incubator upper cover (2), a heating assembly (3), an egg turning assembly (4) and a water supply assembly (5), a first water tank (11) and a second water tank (12) which communicate with each other being disposed inside the incubator base (1), a third water tank (13) communicating with the second water tank (12) being disposed on one side of the incubator base (1), a mesh plate (6) being lapped inside the incubator base (1), an inner wall bottom of the first water tank (11) being higher than an inner wall bottom of the second water tank (12), a water supply assembly being mounted on the third water tank (13), and the water supply assembly (5) being used for supplying water to the first water tank (11), the second water tank (12) and the third water tank (13);

the egg turning assembly (4) comprising egg troughs (41), a connecting plate (42) and an egg turning motor (43), the egg troughs (41) being used for holding a plurality of eggs and being lapped with the incubator base (1) and the connecting plate (42), respectively, the connecting plate (42) being movably connected to the inside of the incubator base (1), and the egg turning motor (43) being mounted on the bottom of the incubator base (1) and being used for driving the connecting plate (42) to slide left and right in the incubator base (1) so as to drive the egg troughs (41) to swing left and right in the incubator base (1);

the heating assembly (3) being used for supplying incubation heat to the eggs in the egg troughs (41), and the incubator upper cover (2) being made of a transparent material and being provided with a control panel (7) for controlling working states of the heating assembly (3) and the egg turning assembly (4);

the water supply assembly (5) comprises a water supply valve (51) and a water supply bottle (52), the water supply bottle (52) is in threaded connection to the water supply valve (51), the water supply valve (51) is embedded in the third water tank (13) and is provided with an air inlet (511) and a water outlet (512) respectively located in the third water tank (13), the water outlet (512) communicates with the water supply bottle (52), and the air inlet (511) is used for supplying air to the water supply bottle (52).

* * * * *